L. A. MAPEL.
SAFETY VALVE.
APPLICATION FILED MAR. 27, 1919.
1,356,457. Patented Oct. 19, 1920.
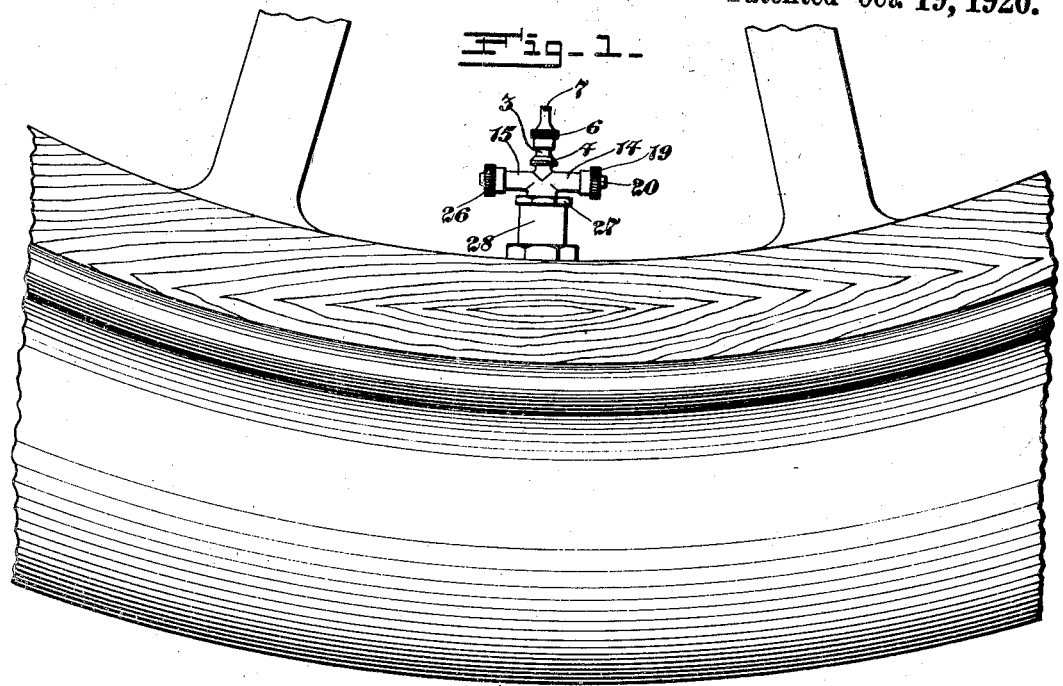
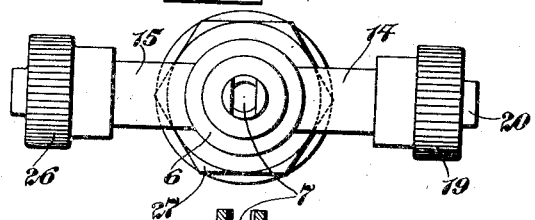
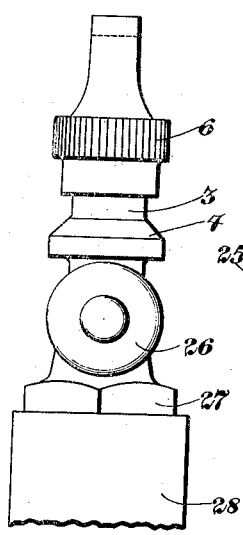
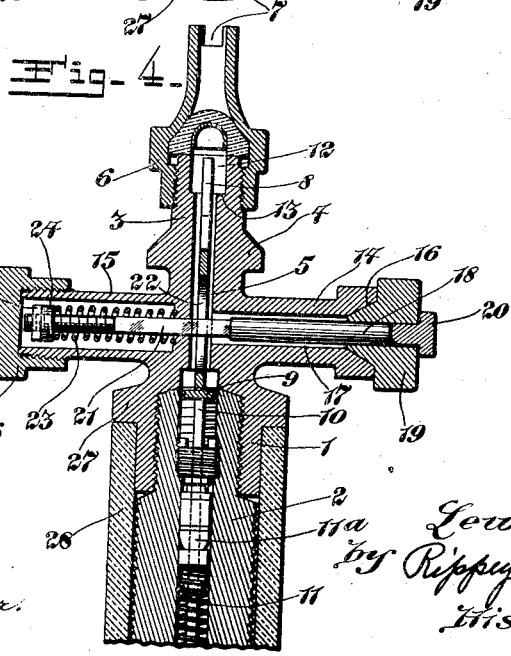
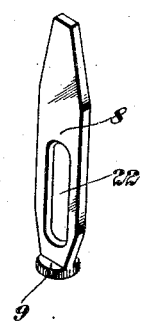
Attest.
Charles A. Becker.
Inventor.
Lewis A. Mapel,
by Rippey & Kingsland,
His Attorneys.

UNITED STATES PATENT OFFICE.

LEWIS A. MAPEL, OF ST. LOUIS, MISSOURI.

SAFETY-VALVE.

1,356,457.  Specification of Letters Patent.  Patented Oct. 19, 1920.

Application filed March 27, 1919. Serial No. 285.403.

*To all whom it may concern:*

Be it known that I, LEWIS A. MAPEL, a citizen of the United States, residing at the city of St. Louis and State of Missouri, have invented a new and useful Safety-Valve, of which the following is a specification.

This invention relates to safety valves.

An object of the invention is to provide an efficient safety valve to be permanently attached to the housing of the regular or usual tire valve equipment after the tire has been mounted on a wheel, provided with means for the attachment of an air chuck for the inflation of the tire, and with means for relieving all pressure over and above the amount required to inflate the tire properly, the valve being provided with means for varying the pressure that may enter the tire before the safety valve will operate to relieve pressure therefrom.

Another object is to provide a valve of the character and for the purpose mentioned including a plunger abutting the stem of the tire valve, and also including means for opening the valve in the air chuck and preventing excess pressure from being applied against the stem of the tire valve.

Another object of the invention is to provide a valve of the character and for the purpose mentioned including a novel construction for protecting the essential and operating parts of the valve to prevent the admission of dust or other foreign substance into the valve mechanism.

Other objects will appear from the following description, reference being made to the drawing illustrating a preferred embodiment of the invention, in which—

Figure 1 is a view illustrating my improved safety valve in connection with the housing of the usual tire valve equipment.

Fig. 2 is an end elevation of the device.

Fig. 3 is a side elevation.

Fig. 4 is a sectional view illustrating the operating parts of the safety valve.

Fig. 5 is a perspective view of the plunger which abuts the stem of the tire valve and which is operated by the air hose device to open the tire valve.

My improved safety valve comprises a housing, one form of which is shown in Fig. 1, having an interiorly threaded portion 1 adapted to be screwed upon the outer end of the housing 2 of the regular or usual tire valve equipment. An extension 3 on said housing is adapted to be engaged by the air chuck and has a circumferential flange or shoulder 4 provided with a beveled outer wall arranged to serve as an abutment for the air chuck to prevent the escape of air. A passage 5 is formed through the extension 3 and admits air from the air chuck into the housing of the regular tire valve equipment.

To prevent the admission of dust and other foreign substances into the valve mechanism a removable cap 6 is employed, the same having threaded connection with the extension 3 and preferably being formed with a notch 7 in its outer end to constitute means for turning the adjustment nut of the safety valve.

Within the passage 5 a plunger 8 is operatively mounted, the same having a base 9 at its inner end arranged to contact with the valve stem 10 of the regular tire valve equipment which, as is well known, is movable axially against the pressure of a spring 11 as required to open the tire valve $11^a$ of the regular tire valve equipment in order to admit air into the tire. When the air chuck is connected to the extension 3 that part thereof which ordinarily engages the valve stem 10 contacts with the plunger 8 and presses the same inwardly thereby moving the valve stem 10 to open the tire valve $11^a$.

The outer end of the extension 3 is formed with a recess 12 which receives the usual valve stem (not shown) on the air chuck and permits said valve stem to actuate the plunger 8. The recess 12 opens into the passage 5, a shoulder 13 being formed around the opening of the passage 5 into said recess and said shoulder constitutes an abutment for the valve stem on the air chuck and thereby stops movement of said stem, thus preventing too great pressure being applied against the plunger 8 and the stem 10. This construction permits sufficient movement of the stem 10 to open the tire valve and thereby prevents said stem from being bent or otherwise disarranged.

The valve housing has two axially alined arms 14—15. The arm 14 has at its outer end a tapered valve seat 16. A passage 17 through the arm 14 communicates with the passage 5. The valve stem 18 passes through a valve 19 having a tapering portion on its inner side matching the valve seat 16. A head 20 on the valve stem holds the valve in place. The valve stem 18 is formed with a flat portion 21 extending through a slot 22 in the plunger 8 and through a slot in the opposite wall of the passage 5, the latter arrangement holding the valve stem from turning, but permitting axial movement thereof.

It will be observed that the slot 22 in the plunger is of sufficient length to permit free movement of the plunger as required for the tire valve to be opened and closed. A spring 23 encircles the valve stem 18 within the opening in the arm 15, the inner end of said spring abutting against the inner end or wall of the recess in which it is mounted and the outer end of said spring abutting against an adjustment nut 24 having adjustable threaded connection with the valve stem 18. The nut 24 is preferably formed with a flange 25 on its outer side adapted to be engaged by the slotted end of the wrench cap 6. As a result of this construction the threaded nut may be adjusted on the valve stem as required to vary the tension of the spring 23 which holds the valve 19 in closed position.

A cap 26 is secured onto the end of the arm 15 and constitutes a seal to protect the operative parts therein from dust and other foreign substances, and seals against the escape of pressure from within the housing.

From the foregoing it will be understood that when the air chuck is connected to the extension 3 of the housing the usual stem (not shown) of the air chuck presses the plunger 8 inwardly to move the stem 10 inwardly a sufficient distance to open the tire valve 11ᵃ to admit air until the desired pressure or inflation is obtained. Then, when the desired pressure at which the device is adjusted to operate is exceeded, the valve 19 is forced open by the air pressure which permits the same quantity or volume of air to escape as enters the valve housing from the air chuck and prevents any additional pressure from entering the tire. Should it be desired to vary the pressure within the tire the nut 24 is adjusted to vary the tension of the spring 23, thus enabling greater or less pressure to enter the tire before the valve 19 will be opened to permit escape or relief of the pressure. The relief valve 19 may be turned on the valve stem 18 without turning the stem, or affecting the spring 23. Therefore, in case the valve 19 becomes stuck it may be easily loosened and caused to function properly without disturbing any of the other operative parts.

The housing is so constructed that the stem, the plunger, the relief valve and all other parts will be free in their operations without interference with each other. The housing is formed with a polygonal flange 27 adapted to be engaged by a wrench for attachment to or detachment from the regular valve equipment.

As shown, a rubber tube 28 is placed around the housing 2 of the regular valve equipment and receives a part of the portion 1 of the housing, the outer end of said tube abutting against the polygonal flange 27, whereby the tube is compressed to form a seal to prevent the entrance of dust and other foreign substances into or between any of the parts.

The valve 19 forms a perfect seal to prevent admission of dust and the like into the passage through the arm 14 and, as previously mentioned, the outer end of the extension 3 is closed by the wrench cap 6, while the outer end of the arm 15 is closed by the cap 26.

Thus it will be understood that my invention comprises a safety valve to be permanently attached to the valve stem of the tire when the tire is on the wheel. However, it may readily be removed when removal is desired for any purpose.

I am aware that the construction and design of the parts may be varied without departure from the scope of the invention. I do not restrict myself to unessential features of construction or arrangement, but what I claim and desire to secure by Letters Patent, is:—

1. In a safety valve of the character described, the combination with a valve housing in permanent connection with a wheel tire and having an air inlet passage therethrough; a valve in said passage; and a spring normally holding said valve in closed position; of a housing adapted to be permanently attached to the first-named housing after the tire is placed on a wheel; an air inlet passage through the second-named housing communicating with the passage through the first-named housing; a plunger in said second-named passage arranged to be engaged and moved by the air chuck to actuate said valve to open position; an outlet passage branching laterally from the passage through the second-named housing; and a valve supported outside of said second-named housing controlling said outlet passage and being operable independently of the inlet passage to relieve all pressure over and above a predetermined amount of pressure to which it is desired to inflate the tire.

2. In a safety valve of the character described, the combination with a valve housing in permanent connection with a wheel tire and having an air inlet passage therethrough; a valve in said passage; and a spring normally holding said valve in closed position; of a housing adapted to be permanently attached to the first-named housing after the tire is placed on a wheel; an air inlet passage through the second-named housing communicating with the passage through the first-named housing; a plunger in said second-named passage arranged to be engaged and moved by the air chuck to actuate said valve to open position; a valve supported outside of said second-named housing operable independently of the inlet passage to relieve all pressure over and above a predetermined amount of pressure to which it is desired to inflate the tire; a valve stem in connection with said valve and means supported wholly by said valve stem and within the second-named housing for varying the pressure required to open said last-named valve.

3. A safety valve of the character described, comprising a housing adapted to be permanently connected to the housing of the usual tire valve after the tire is placed on a wheel; an air inlet passage through said housing communicating with the passage through the usual tire valve housing; an element mounted in the passage in said first-named housing for actuating the stem of the tire valve to open the tire valve; a pressure relief passage branching laterally from the rear inlet passage in said first-named housing; a manually movable valve supported outside of said housing normally closing said relief passage and movable to open position by the pressure in said passage when the pressure of inflation within the tire exceeds a predetermined maximum; and a device outside of said relief passage holding said valve in closed position while the inflation pressure within the housing is at or below the predetermined maximum.

4. A safety valve of the character described, comprising a housing adapted to be permanently connected to the housing of the usual tire valve after the tire is placed on a wheel; an air inlet passage through said housing communicating with the passage through the usual tire valve housing; an element mounted in the passage in said first-named housing for actuating the stem of the tire valve to open the tire valve; a pressure relief passage branching laterally from the rear inlet passage in said first-named housing; a manually movable valve supported outside of said housing normally closing said relief passage and movable to open position by the pressure in said passage when the pressure of inflation within the housing exceeds a predetermined maximum; a device outside of said relief passage holding said valve in closed position while the inflation pressure within the tire and housing is at or below the predetermined maximum; and means supported independently of the housing for adjusting said device to vary the amount of pressure required to open said valve.

5. A safety valve of the character described, comprising a housing adapted to be permanently attached to the valve stem housing of the usual tire valve equipment after the tire is placed on a wheel; an air inlet passage through said housing for admitting air into the passage through the valve stem housing; means on said first-named housing for connection with an air hose; an element in the passage through the first-named housing arranged to be moved by the usual air hose equipment to open the tire valve; an abutment preventing the air hose equipment from bending the stem of the tire valve; an outlet passage in said housing; and a manually movable valve supported outside of said housing normally closing said outlet passage and arranged to be opened by the pressure within the tire and housing when such pressure exceeds a predetermined amount.

6. A safety valve of the character described, comprising a housing adapted to be permanently attached to the valve stem housing of the usual tire valve equipment after the tire is placed on a wheel; an air inlet passage through said housing for admitting air into the passage through the usual tire valve housing; means on said first-named housing for connection with an air hose; an element in the passage through the first-named housing arranged to be moved by the usual air hose equipment to open the tire valve; an abutment preventing the air hose equipment from bending the stem of the tire valve; an outlet passage in said housing; a manually movable valve supported outside of said housing normally closing said outlet passage and arranged to be opened by the pressure within the tire and housing when such pressure exceeds a predetermined amount; and means outside of said outlet passage for varying the amount of pressure required to open said last-named valve.

7. A safety valve of the character described, comprising a housing adapted to be permanently connected to the housing of the usual tire valve after the tire is placed on a wheel; a passage through said housing communicating with the passage through the usual tire valve housing; an element mounted in the passage in the first-named housing concentric with the plane of the axis of the tire valve stem for actuating the stem of the tire valve to open said valve; a pair of radial alined arms in connection with said first-named housing; a relief passage through one of said arms communicating with the passage in the housing; a valve normally closing said relief passage and movable to open position by the pressure in said passage when the pressure of inflation in the housing exceeds a predetermined maximum; and a device in the other one of said radial arms normally holding said valve in closed position and permitting said valve to open under the pressure as aforesaid.

8. A safety valve of the character described, comprising a housing adapted to be permanently connected to the housing of the usual tire valve after the tire is placed on a wheel; a passage through said housing communicating with the passage through the usual tire valve housing; an actuator in said passage in axial alinement and in contact with the stem of the usual tire valve; a pair of radial arms in connection with said housing; a relief passage through one of said arms; a valve for opening and closing said relief passage and being movable to open position by the pressure in said passage when the pressure of inflation within the housing exceeds a predetermined maximum; a valve stem extending through said valve and across said first-named passage and into the other one of said radial arms; means for preventing said valve stem from turning; and a device in said other radial arm coöperating with said valve stem to hold said valve normally in closed position and arranged to yield to permit said valve to be opened by the pressure in said passage when the pressure of inflation within the housing exceeds a predetermined maximum.

9. A safety valve of the character described, comprising a housing adapted to be permanently connected to the housing of the usual tire valve after the tire is placed on a wheel; a passage through said housing communicating with the passage through the usual tire valve housing; an actuator in said passage in axial alinement and in contact with the stem of the usual tire valve; a pair of radial arms in connection with said housing; a relief passage through one of said arms; a valve for opening and closing said relief passage and being movable to open position by the pressure in said passage when the pressure of inflation within the housing exceeds a predetermined maximum; a valve stem extending through said valve and across said first-named passage and into the other one of said radial arms; means for preventing said valve stem from turning; a device in said other radial arm coöperating with said valve stem to hold said valve normally in closed position and arranged to yield to permit said valve to be opened by the pressure in said passage when the pressure of inflation within the housing exceeds a predetermined maximum; and means for varying the amount of pressure required to open said valve.

10. A safety valve of the character described, comprising a housing adapted to be permanently attached to the housing of the usual tire valve after the tire is placed on a wheel; a passage through said housing arranged to communicate with the passage through the tire valve housing; a plunger in said passage in axial alinement and in contact with the stem of the usual tire valve arranged to be moved by the air hose equipment to open the tire valve; a pair of radial alined arms in connection with said first-named housing; a relief passage through one of said arms communicating with the passage through said first-named housing; and the other one of said radial arms having a recess therein; a valve stem extending through said relief passage and into said recess across the axis of said plunger; a valve revolubly mounted on said stem for closing said relief passage; and a spring encircling said stem in the recess in the other one of said radial arms normally holding said stem in position to hold said valve closed and yielding to permit said valve to be opened by the pressure within the housing when such pressure exceeds a predetermined amount.

11. A safety valve of the character described, comprising a housing adapted to be permanently attached to the housing of the usual tire valve after the tire is placed on a wheel; a passage through said housing arranged to communicate with the passage through the tire valve housing; a plunger in said passage in axial alinement and in contact with the stem of the usual tire valve arranged to be moved by the air hose equipment to open the tire valve; a pair of radial alined arms in connection with said first-named housing; a relief passage through one of said arms communicating with the passage through said first-named housing, and the other one of said radial arms having a recess therein; a valve stem extending through said relief passage and into said recess across the axis of said plunger; a valve revolubly mounted on said stem for closing said relief passage; a spring encircling said stem in the recess in the other one of said radial arms normally holding said stem in position to hold said valve closed and yielding to permit said valve to be opened by the pressure within the housing when such pressure exceeds a predetermined amount; and means for varying the tension of said spring.

LEWIS A. MAPEL.